United States Patent
Kalavade et al.

[11] Patent Number: 5,961,599
[45] Date of Patent: Oct. 5, 1999

[54] APPARATUS AND METHOD FOR COMPUTING THE PROCESSING DELAY OF ADAPTIVE APPLICATIONS NETWORK TERMINALS AND APPLICATIONS THEREOF

[75] Inventors: Asawaree Kalavade; Pratyush Moghe, both of Monmouth, N.J.

[73] Assignee: Lucent Technologies Inc., Murray Hill, N.J.

[21] Appl. No.: 08/950,638

[22] Filed: Oct. 15, 1997

Related U.S. Application Data

[60] Provisional application No. 60/028,375, Oct. 15, 1996.

[51] Int. Cl.⁶ .............................. G06F 11/34; G06F 13/00
[52] U.S. Cl. ............................................. 709/224
[58] Field of Search ..................... 395/200.54; 709/224

[56] References Cited

U.S. PATENT DOCUMENTS

| | | | |
|---|---|---|---|
| 5,193,151 | 3/1993 | Jain | 709/237 |
| 5,583,792 | 12/1996 | Li et al. | 709/224 |
| 5,696,948 | 12/1997 | Cruz et al. | 702/176 |
| 5,815,667 | 9/1998 | Chien et al. | 709/232 |
| 5,822,543 | 10/1998 | Dunn et al. | 709/224 |
| 5,862,337 | 1/1999 | Gray | 709/224 |

*Primary Examiner*—Zarni Maung
*Assistant Examiner*—Kenneth R. Coulter

[57] ABSTRACT

Method and apparatus for computing the processing delay of a terminal running a system of one or more adaptive applications, each adaptive application consisting of a set of executable tasks sharing system resources, the set of execution tasks having execution times depending on a particular adaptation level, the method including the steps of: modelling the adaptation of each adaptive application as an adaptation process having steady-state probability distribution representing the fraction of time spent by the application in a particular adaptation level; modelling execution time variations of tasks in each application, for a particular adaptation level, by a random variable of arbitrary and known probability distribution; modeling a system-wide computation by a state process for capturing transitions of executing tasks as the tasks currently use or contend for the shared system resources, the state process being characterized as a stochastic process; calculating a stationary distribution $\pi^M$ from the stochastic state process; and, from the stationary distribution, calculating the processing delay of the adaptive applications.

32 Claims, 8 Drawing Sheets

APPARATUS AND METHOD FOR COMPUTING THE PROCESSING DELAY OF ADAPTIVE APPLICATIONS NETWORK TERMINALS AND APPLICATIONS THEREOF

RELATED APPLICATIONS

This application claims the benefit of provisional U.S. patent application Ser. No. 60/028,375 filed Oct. 15, 1996.

FIELD OF THE INVENTION

The present invention relates generally to applications employed by networks Internet hosts that adapt tasks in accordance with network traffic conditions, and more particularly, to an apparatus and method for computing processing delay of adaptive applications and applications thereof.

BACKGROUND OF THE INVENTION

There is an intensive research and development effort ongoing in trying to make slim hosts, e.g., PDA's, settop boxes, and personal communicators Internet-aware. Such hosts have limited processing capability but are being used to support increasingly sophisticated applications. Such slim hosts are herein referred to as terminals, to distinguish them from the hosts that connote a PC or workstation with larger processing capability and memory. The next generation terminals are expected to support continuous-media ("CM") applications such as audio and video streams, along with other traditional applications. Currently such CM applications are supported on powerful hosts with some of these applications implemented and delivered using the Real-Time Transport Protocol (RTP) transport framework such as described in "H. Schulzrinne, S. Casner, R. Frederick and V. Jacobson, "RTP: A Transport Protocol for Real-Time Applications", RFC 1889, Audio-Video: Transport Working Group, January 1996, the contents of which is incorporated by reference herein. It is expected that such adaptive CM applications will eventually be deployed on terminals. Under such a scenario, the processing delay on end terminals is expected to become a significant part of the end-to-end QoS. Processing delay on the slim terminals is thus an important QoS measure.

To compute the processing delay several challenges exist:

(1) Applications can exhibit run-time data-dependent behavior. That is, the processing demanded by applications like audio-video encode and decodes, web-based processing etc. can depend on the run-time behavior of the applications, and can be thus "dynamic". The processing demands of such applications are not known "deterministically" at compile time.

Figure 1:
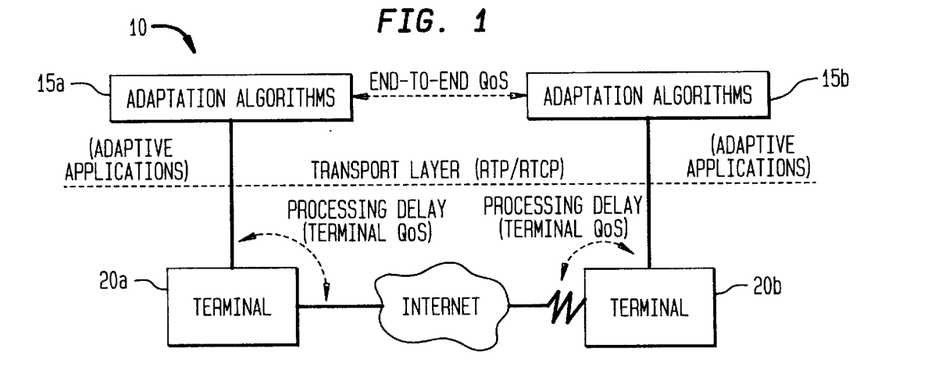
FIG. 1 illustrates an interconnected network illustrating the End-to-end QoS and Terminal QoS (processing delay)

(2) Applications such as audio and video are being improvised to "adapt" to rapidly changing network conditions so that they do not congest the network. For instance, with reference to FIG. 1 illustrating terminals $20a, b$ in an interconnected network 10, applications can use RTP-based adaptation algorithms $15a,b$ based on end-to-end QoS measures such as packet loss. In such algorithms, the adaptation algorithm moves the application to lower adaptation levels when the packet loss in the network increases to between certain threshold levels. A lower adaptation level typically corresponds to a reduced bit-rate and hence lower network packet traffic. In general, changing adaptation levels changes the processing demand on the terminals $20a,b$. The reference to J.-C. Bolot and A. Vega-Garcia entitled "Control Mechanisms for Packet Audio in the Internet", Proc. IEEE Infocom '96, San Francisco, Calif., April 1996, pp. 232–9, describes an example illustrating how the CPU execution time of a packet audio application increases with lowered adaptation level. For instance, LPC encoding (lower adaptation level) in an audio application incurs approximately 110 times the execution time as PCM encoding (higher adaptation level). In summary, since the adaptations of such applications continually fluctuate based on network conditions, the processing, demands imposed by an application on the terminal also fluctuate accordingly.

(3) Multiple applications may be concurrently running on a terminal. The total processing demand on the terminal as an end-system also varies depending on the instantaneous number and type of applications that run at that particular time.

Based on the above three reasons, it is clear that processing delay is highly variable and computing it is a challenging task. Currently there do not exist any systematic methods or apparatus of computing it within available frameworks. There is a critical need for a method and tool that can analytically quantify processing delay by representing the various variations presented in the three points above by a unified modeling framework.

SUMMARY OF THE INVENTION

The invention relates to a method implemented by a terminal (network host having limited processing power) that supports multiple concurrent adaptive applications, with each adaptive application utilizing end-to-end QoS feedback to adapt itself according to its adaptation algorithm. The method computes the exact processing delay distribution, i.e., the terminal QoS, associated with each adaptive application.

In accordance with the principles of the invention, the method first generates a model of the adaptation of applications at the sender and receiver terminals as a time-varying dynamic process with each adaptive application employing different adaptation levels to represent a specific bit rate corresponding to, e.g., refresh or frame rate (for a video application) or a coding layer (for an audio application), with each adaptation level change occurring at receipt of a performance feedback report, e.g., network packet loss or delay, from a statistics gathering network manager, e.g., in accordance with RTP/RTCP. The method models the transition of each adaptation process through time-invariant probabilities. The method additionally models each application as a task graph with several alternative execution paths, with each task having an arbitrarily distributed execution time. Each execution path models the sequence of tasks associated with a particular adaptation. It is assumed that only one of the several execution paths in the application task graph is activated at run-time depending on the current adaptation level; this provides the link between the adaptation in the application and its computation demand. Within each execution path, the run-time environment activates the tasks to be run on a processor based on a priority function with the tasks being non-preemptive. With the assumption that the task-level changes (rate of milliseconds) are much faster than the changes in the adaptation process (or changes in execution path which occur at a rate of seconds or minutes) the state of computation on the processor between two consecutive changes in the adaptation process can be characterized systematically by a stochastic process called "computation process" or "state process". This process can be analyzed to obtain the processing delay, conditioned on a particular level of the adaptation process. The third step of the method extends this to obtain the processing delay, averaged over all the fluctuations of the adaptation process.

The main result of the invention is to compute the exact processing delay distribution in terms of the stationary distribution of the jumps made by the computation process. Advantageously, the computing methodology can be implemented as a software tool to help solve several important problems including those such as: (1) design of terminals, whereby architectural issues and run-time priority schedulers for adaptive applications are engineered based on the processing delay output of the tool; (2) design of adaptation algorithms and application managers, whereby multiple concurrent applications on a terminal are adapted by a single application manager that has a global view of the terminal based on the processing delay output of the tool; and, (3) rapid design space exploration of terminals, since analytical computation of processing delay is typically much faster than alternative approaches such as simulation.

The methodology of the invention can additionally be used to design a system-architecture supporting dynamic, network-centric systems and to evaluate the performance and mapping of a particular system architecture when multiple dynamic applications are being supported.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE INVENTION

Figure 2A:
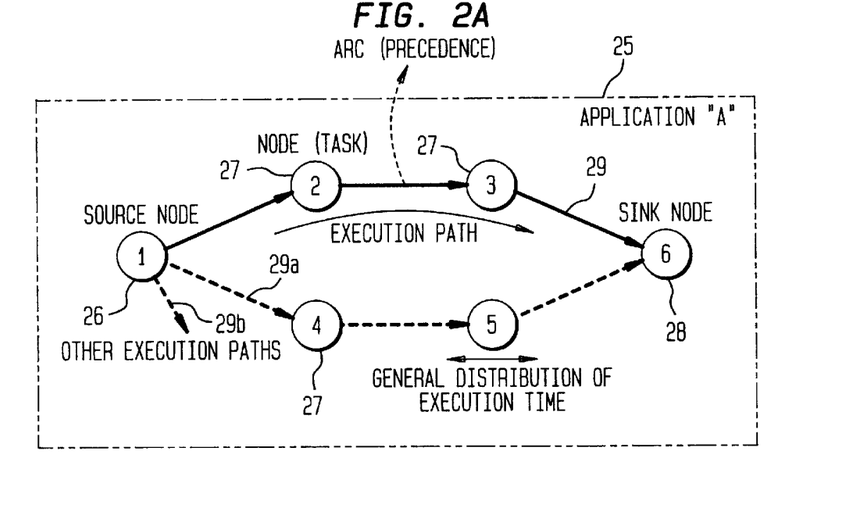
FIG. 2(a) illustrates the task graph for an application specification.

FIG. 2(a) illustrates a model of an application 25 specified by a task graph consisting of nodes 27 and arcs 29 with nodes 27 representing task-level computations and arcs 29 specifying precedences between nodes. Each node 27 in the graph is assumed to incur an arbitrarily distributed execution time on its designated resource, e.g., processor. Without loss of generality, it is assumed that the execution time is a discrete random variable that takes one of the values $e_1$, $e_2, \ldots, e_k$ with probabilities $p_1, p_2, \ldots, p_k$ respectively, where these probabilities sum to 1. Such a distribution can approximately model execution time variations due to data dependencies or due to architectural effects like cache misses and I/O contention. As shown in FIG. 2(a) an application 25 can consist of several alternative execution paths indicated by broken lines 29a,b.

Figure 2B:
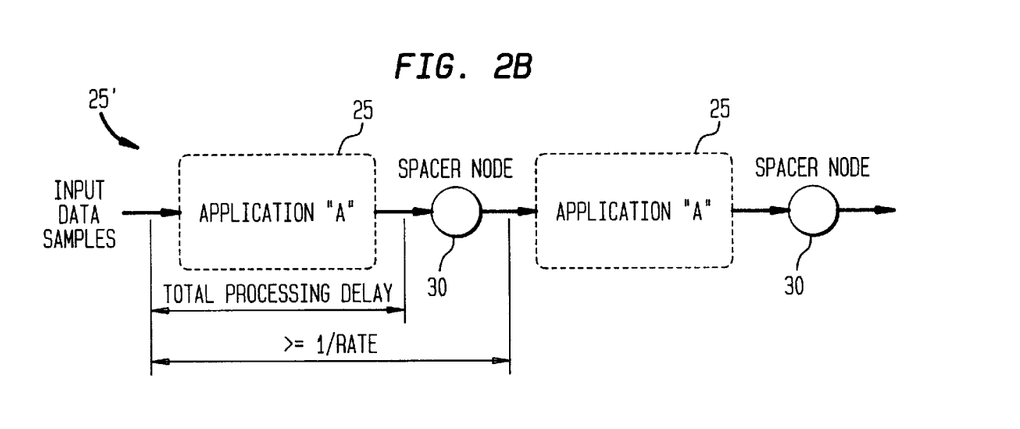
FIG. 2(b) illustrates the task graph for an application exhibiting repetitive behavior.

The behavior of repetitive continuous media applications can also be modelled as shown in FIG. 2(b) which illustrates the repetitive behavior of an application 25 as successive iterations. An application can consist of several alternative execution paths within each iteration, each path being made up of a succession of nodes between the source and sink nodes. When multiple arcs merge into a node, it is assumed that the node waits for execution till it receives data from all its incident arcs that are included in the current execution path. To model the repetitive behavior of CM applications, it is additionally assumed that data samples arrive at the (infinitely buffered) source node of an application at a fixed interarrival frequency dictated by the input rate of the application. For instance, in a video application this rate could correspond to the refresh rate; if the refresh rate is 30 frames/sec, the interarrival time is 33 ms. The precise time when these input samples are taken in by the source node for processing depends on when the earlier samples have finished processing. If the earlier samples are still being processed by the application when the next input samples arrive, the input samples are made to wait, otherwise, they are taken in for processing immediately. This behavior is modeled in the application task graph 25' by the use of an artificial node called the spacer node 30 as shown in FIG. 2(b). Thus, samples are made to wait if the processing delay of the earlier samples is less than the interarrival time between samples; the spacer node 30 releases samples at exactly the interarrival frequency. If, on the other hand, the processing delay is more than the interarrival interval, the spacer node releases samples immediately after the processing is done. In either case, the application task graph 25' repeats as soon as the spacer node releases the samples.

Figure 3A:
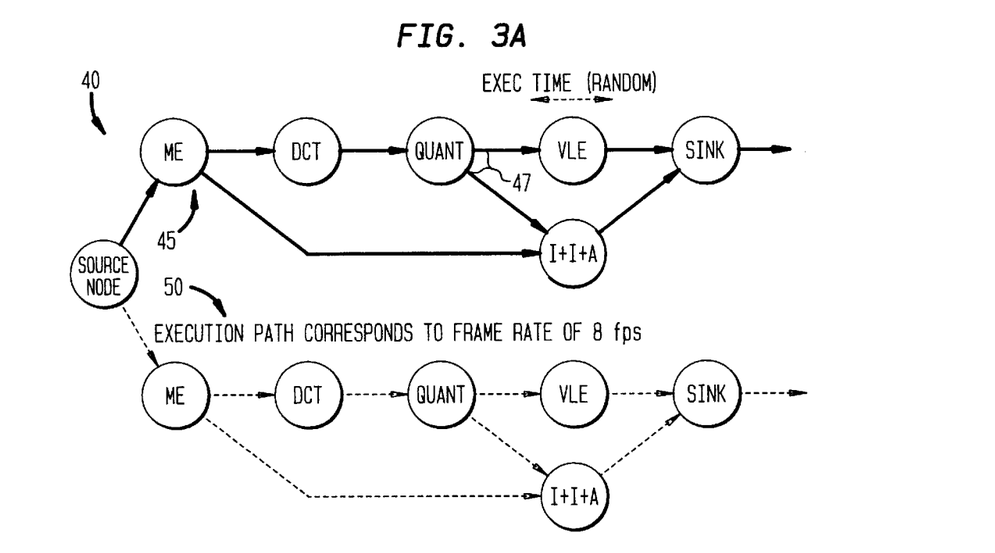
FIGS. 3 illustrates an example the task graph for a H.261 video encoder application.
Figure 3B:
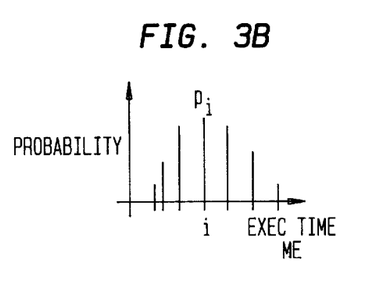
Figure 3C:
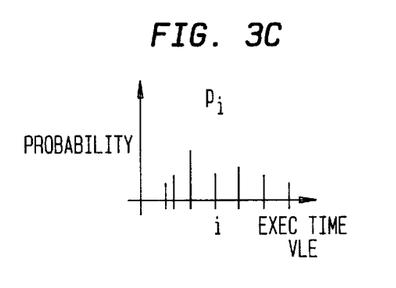

As stated before, the current level of the adaptation process of the application determines the execution path to be activated within the current iteration of the application. FIG. 3 illustrates an example H.261 video encoder application 40 such as described in V. Bhaskaran, K. Konstantinides, *Image and Video Compression Standards: Algorithms and Architectures*, Kluwer Academic: Publishers, 1995, with ME representing the Motion Estimation and Compensation processing node. DCT representing the Discrete Cosine Transform processing node, the Quant representing the quantizer node, the VLE representing the Variable Length Encoder processing node, and I+I+A, representing the I Quant+I DCT+Adder nodes. In FIG. 3, only a single iteration of the application is indicated, however, two alternative execution paths 45 and 50, each with different time intervals available for processing are shown. The two paths 45, 50 correspond to refresh rates of; e.g., 15 fps and 8 fps, respectively. One of the two paths is activated at the beginning of each iteration depending on the latest adaptation level. The fork 47 in each execution path after the quantizer indicates that data samples traverse both the arcs to the VLE and the IQuantizer. It is understood that the execution times of each individual node can vary depending upon the application's adaptation. The execution time variation for each node, e.g., nodes ME and VLE can be modeled by a distribution as shown in FIG. 3. A distribution can approximately model execution time variations due to data dependencies or due to architectural effects like cache misses and I/O contention. Of course, there may exist nodes having execution times that do not vary, e.g., node DCT.

It should be understood that an audio encoder could be described similarly, however, unlike video, the input rate of audio samples is typically constant. In such a case, an adaptive audio encoder can have different execution paths represent different encoding algorithms, not different refresh rates. The adaptation levels and the most recent RTCP feedback can be used to switch between different encoding algorithms like PCM, ADM (Adaptive Delta Modulation), GSM, LPC, or their combinations, etc.

Figure 4:
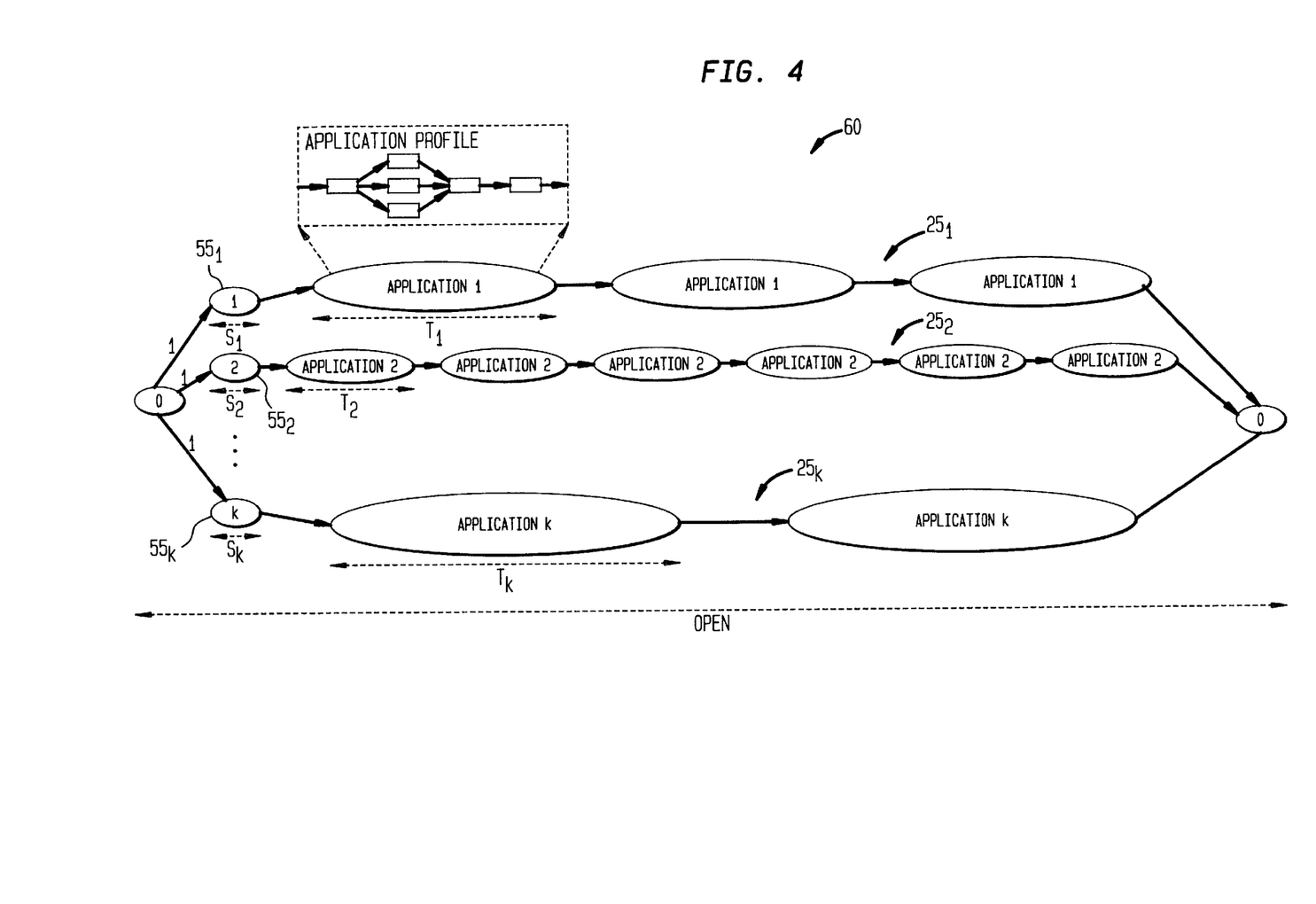
FIG. 4 illustrates a single aggregated graph of a mix of applications and indicating their temporal skew as a node.

To model multiple concurrent applications, the task graphs of individual applications are combined into a single aggregated graph. FIG. 4 illustrates a single aggregated graph 60 of a mix of applications $25_1, 25_2, \ldots, 25_k$. Since applications can begin at different starting times, their temporal skew is captured by the addition of a node, e.g., $55_1$, $55_2, \ldots, 55_k$, to each application that models the lag of each application. The aggregated graph terminates into a final sink node when all the individual applications finish their processing at the same exact time. The processing delay is measured over the interval of the aggregated graph.

Figure 5:
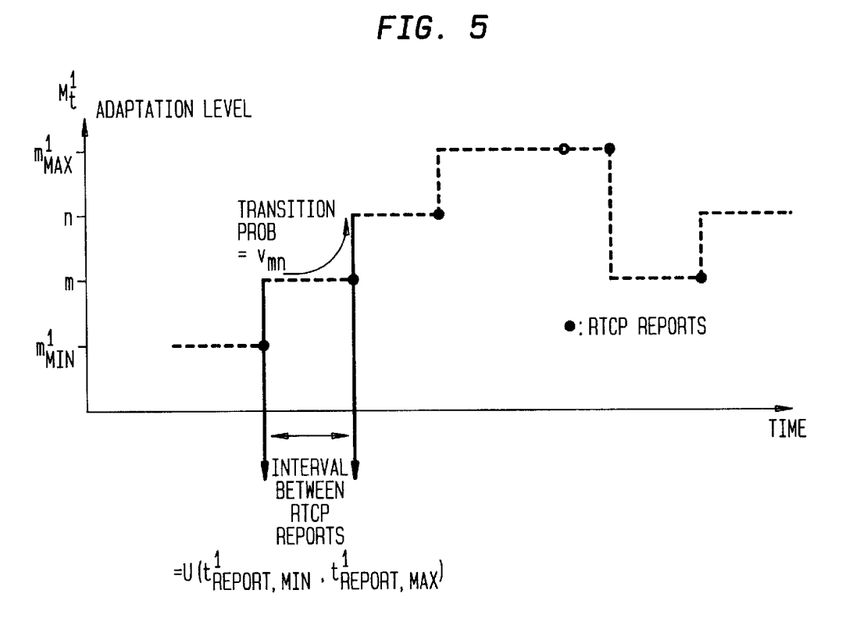
FIG. 5 illustrates for an example adaptation, the transitions between adaptation levels "m" and "n"

As mentioned above, applications adapt based on RTCP-like feedback of network congestion parameters such as packet loss or delay. This feedback occurs through sender (or receiver) reports with the assumption that the inter-report time $T_{report}^A$ to an adaptive application is uniformly distributed between minimum and maximum limits $t_{report,min}^A$ and $t_{report,max}^A$, respectively. This is in accordance with the parameters defined in the above-mentioned reference to H. Schuizrinne, S. Casner, R. Frederick and V. Jacobson ("RFC" 1889-January 1996). Once a report is received, the current adaptation level is either retained or changed depending on the end-to-end QoS feedback. The adaptation level can be modelled at the receipts of each report as a Markovian jump process with level-dependent transitions. Thus, the possibility of different QoS reports in a level are approximated by different probabilities. FIG. 5 illustrate for an example adaptation the transitions between adaptation levels "m" and "n" that are assumed to occur with a probability $v_{mn}$. This probability can be determined by profiling the adaptation of an actual application under an adaptation algorithm. From FIG. 5, it is assumed that the application will be in a particular adaptation level (e.g., PCM for an adaptive audio application) for a particular amount of time, i.e., the adaptation process remains at that level for the time interval between RTP/RTCP feedback reports from the network. This interval is assumed to be uniformly distributed, e.g., every 2 minutes. As described, the adaptation process is very valuable in applications of the methodology described herein.

Assuming each application adapts based on its reported end-to-end QoS, independent of other applications, similar models for all the concurrent applications being supported on a terminal are constructed. If $M_t^i$ represents the adaptation level of application i at instant t, the joint process $M=(M_t^1, M_t^2, \ldots, M_t^i \ldots,)$ represents the joint adaptation level of all the applications currently running on the terminal.

Figure 6:
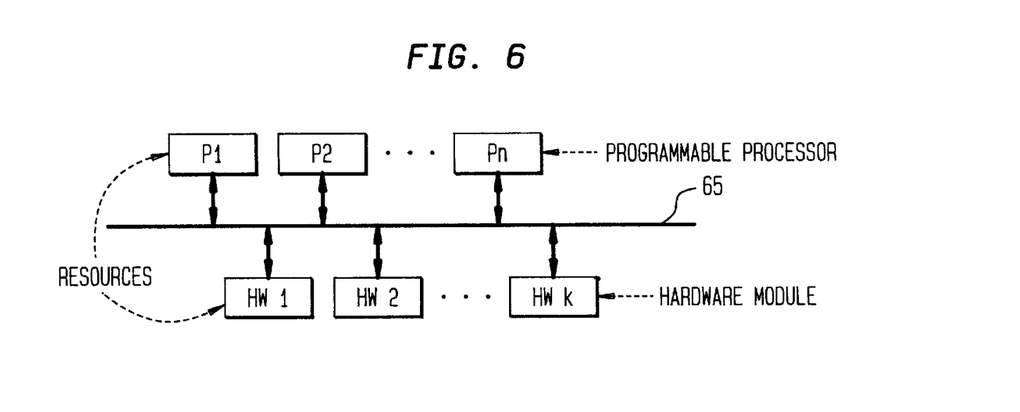
FIG. 6 illustrates an example system architecture for embedded systems.

The processing load that is offered to the terminal (FIG. 1) by multiple adaptive applications is now characterized. The following assumptions regarding the run-time environment in the terminal are first made: 1) Mapping of tasks to the resources, e.g., a processor, is done at compile time and is known, for example, in the reference "System-level Codesign of Mixed Hardware-Software Systems", Ph.D. Dissertation, EECS Department, University of California, Berkeley, 1995, to A. Kalavade, the contents and disclosure of which is incorporated by reference herein. FIG. 6 illustrates an example system architecture consisting of a set of special-purpose hardware modules HW1, ..., HWk and a set of programmable processors P1, P2, ..., Pn connected via a system bus 65; 2) Tasks are non-preemptive; and 3) A simple run-time scheduler, e.g., EDF, RMS, and FCFS scheduling policies, allocates one of the possibly many waiting tasks to a ready processor based on a known priority function. Although not described, communication costs and other architectural effects, e.g., limited memory, cache performance, etc., can be easily incorporated within the model.

As discussed herein, changes in the adaptation level of each application trigger changes in the execution path of the application. Naturally, the processing load changes when the adaptation level changes and it is extremely hard to analyze changes in the processing load coupled with the changes in the adaptation level. However, as changes in the adaptation level are on a much larger time-scale than the changes in the processing due to different tasks, it can be assumed that the aggregate processing load on the terminal reaches steady-state between the consecutive changes in the joint adaptation process. Thus, the analysis is simplified considerably by "decoupling" the dynamics of the processing load from the dynamics of the adaptation process.

The state of computation in the terminal is represented through a state process (also called computation process) that can be modeled as a semi-Markov stochastic process, (hereinafter referred to as state process "X"). Such a process has only one-step memory and the stationary probability distribution (hereinafter referred to as "π") of its jumps to a particular state can be exactly computed. This in turn enables the computation of the processing delay distribution and other performance measures in terms of π.

Assuming that the execution time of each node on its mappings is known, and given that the transition sequence $A=\{A_n, n=0, 1, \ldots\}$ is the time-instants when the state of the computation changes, (where $A_0 \triangleq 0$), the following variables that characterize the state of computation at any time are now defined:

1) a vector sequence $Y=\{Y_n, n=0, 1, \ldots\}$, where $Y_n=(I, w_I)=$(set of nodes ready and waiting at transition time $A_n^-$, the delay incurred by these nodes thus far), where $A_n^-$ denotes the time just prior to the nth transition time, 2) a vector sequence $Z=\{Z_n, n=0, 1, \ldots\}$, where $Z_n=(J, r_J)=$(set of nodes that are running at transition time $A_n$, remaining execution time of these nodes). Sequences Y and Z capture information about running and waiting nodes.

3) a sequence U that stores, at discrete points in time, information about how long an application path has been running, i.e., $U=\{U_n, n=0, 1, \ldots\}$, where $U_n=$(App, $m^{App}$, $t^{App}$)=(application, adaptation level of application at instant $A_n^-$, elapsed time of application at time $A_n^-$). Here, $t^{App}$ is set to zero at the start of each application iteration, and is incremented at transitions when nodes in that iteration finish running or finish waiting.

A key result of the above formulation is that the joint sequence (Y, Z,U) represents the state of computation at each transition and is a Markov chain. By joining the state of computation between transitions by straight lines as shown in FIG. 7(b), the state process X is obtained that is a continuous-time stochastic process and since its underlying jump process (Y, Z, U) is Markovian, it is a semi-Markov process.

Figure 7A:
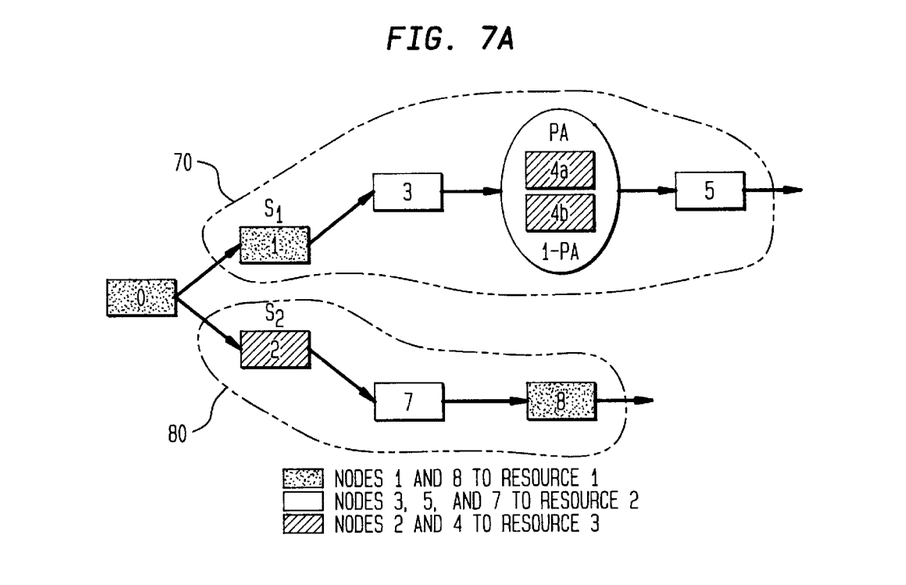
FIG. 7(a) illustrates a simple example of two concurrent running applications.
Figure 7B:
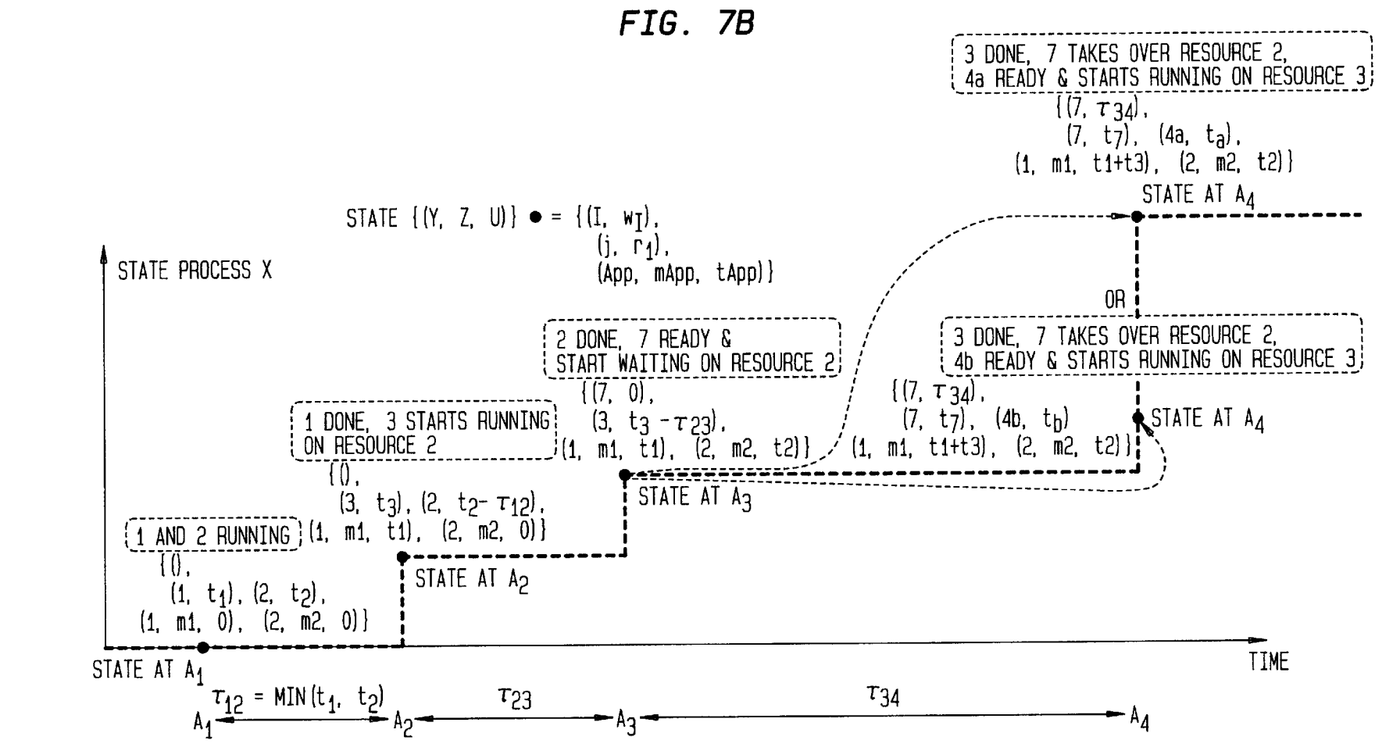
FIG. 7(b) illustrates the state process for the example of FIG. 6(a).

To illustrate the foregoing, FIG. 7(a) shows a simple example of two running applications having concurrently running execution paths 70 and 80. As indicated in the FIG. 7(a), nodes 1 and 8 are mapped to a first resource, e.g., processor, nodes 3, 5 and 7 are mapped to a second resource, and, nodes 2 and 4a and 4b are mapped to a third resource. For this illustration, the execution times of each node is $t_k$ and is constant except for node 4 which has an execution time of $t_{4a}$ with a probability "pa" and an execution time of $t_{4b}$ with a probability "1-pa". The adaptation levels of applications 1 and 2, i.e., (1,2) is indicated as (m1,m2). FIG. 7(b) illustrates the state process X for the example of FIG. 7(a). As shown in FIG. 7(b), State $\{(Y,Z,U)\} = \{(I, w_I) (J, r_J)$ (App, $m^{App}$, $t^{App}$))}={(set of waiting nodes, time waited so far), (set of running nodes, remaining running time), (application, adaptation level, elapsed time)}. At instant A1, nodes 1 and 2 are running. The state X is defined as {( ), (((1,t1),(2,t2)), ((1,m1,0),(2,m2,0))}, which means {(no nodes waiting), (1 running with remaining time t1, 2 running with remaining time t2), (application 1 in adaptation level m1 and elapsed time 0, application 2 in level m2 with elapsed time 0)}. After time $\tau_{12}$, which is the minimum of t1 and t2 (suppose t1<t2), node 1 is done. This results in a new transition in the state process at A2. At this point, node 3 starts execution. After a while, at A3, node 2 finishes. At this point 7 is ready to run. However, 7 is mapped onto the same resource as 3. Since node 3 is still running, node 7 goes on the waiting list. The state X at A3 is hence specified as ((7 waiting and has waited for 0 time so far), (3 is running with remaining time t3-$\tau_{23}$), (application 1 in level m1 has elapsed time t1, application 2 in level m2 has elapsed time t2)). When node 3 finishes, node 4 can start running. Since node 4 has two possible execution times, this leads to two possible states at A4. The first state (with probability pa) corresponds to node 4 running with time t4a and the second (with probability of transition 1-pa) with time t4b. This process is continued to compute the entire state space. Having defined the state space X (a stochastic process, semi-Markovian), the terminal QoS, measures can now be derived as follows:

First, for a given vector M of adaptation levels, the stationary distribution $\Pi_{ija}^M$ of the sequence (Y, Z, U), is computed, where (i,j,a) represents a state visited by (Y, Z, U), i.e., i, j and a are shorthand for $(I, w_I)$, $(J, r_J)$ and (App, $m^{App}$, $t^{App}$), respectively. As the joint process (Y, Z,U) is a discrete-time Markov chain, i.e., when (Y, Z,U) jumps from state (i,j,a) to state (k, l,c), its future evolution is independent of the past, given state (i,j,a), this chain is therefore completely specified in terms of its transition probability function defined by:

$$R_{ija}^{klc} \triangleq P((Y_{n+1}, Z_{n+1}, U_{n+1}) = (k, l, c) \mid (Y_n, Z_n, U_n) = (i, j, a))$$

(i,j,a), (k,l,c)∈S, where S is the state space of X. $R_{ija}^{k1c}$ is the probability that (Y, Z, U) moves from a state (i,j,a) to the state (k, l, c) in a single jump. This one-step probability can be determined for a particular set of applications. It can be shown that R has a unique stationary distribution $\pi^M$, under fairly general conditions. See, e.g., E. Cinlar, *Introduction to Stochastic Processes*, Prentice-Hall, Englewood Cliffs, 1975, the contents and disclosure of which are incorporated by reference herein. The stationary distribution is the probability that (Y, Z, U) jumps to state (i,j,a), given that (Y,Z,U) changes states. The stationary distribution $\pi^M$ can be computed from R, since it satisfies the following linear equations:

$$\sum_{(i,j,a) \in S} \Pi_{ija}^M \cdot R_{ija}^{klc} = \Pi_{klc}^M, \forall (k, l, c) \in S, \text{ and } \sum_{(k,l,c) \in S} \Pi_{klc}^M = 1.$$

To obtain the stationary distribution unconditioned of adaptation level M, it is assumed that the adaptation process converges to a steady-state distribution $\gamma$. Here, $\gamma_M$ is roughly the long-term fraction of time the adaptation process spends in level M. $\gamma$ can be computed easily from the transition matrix of the adaptation process and the interval (assuming uniform distribution) of the RTCP reports. Particularly, given the stationary distribution $\Lambda_m$ with m∈M, $$\sum_{m,n \in M} \Lambda_m \cdot v_{mn} = \Lambda_n,$$

(a set of equations) such that $$\sum_{m \in M} \Lambda_m = 1 \cdot v_{mn}$$

is the transition probability as described above with reference to FIG. 5. After solving the set of recursive equations, the steady state distribution $\gamma_m$ is readily determined as $\gamma_m = \Lambda_m$ and equals the fraction of the long-term time spent by the joint application process M in level m.

The unconditioned stationary distribution $\pi$ of the state process is determined as follows:

$$\Pi_{ija} = \sum_{\forall M} \Pi_{ija}^M \cdot \gamma_M.$$

The average nodal wait of a node is defined as the mean time the node has to wait, once ready, before it can run on a resource to which it is mapped. This measure is useful to predict processing bottlenecks for specific tasks within an application. The average nodal wait and the distribution for the processing delay is now calculated as follows:

Denote a ready state (i,j,a)=((I, $w_I$), (J, $r_J$) and (App, $m^{App}$, $t^{App}$)) for a particular node b as the state when node b is ready because all its predecessors have executed. Since this is a ready state for node b, node b is a part of set J, and in fact, the value of its remaining execution time $r_b$ is equal to its execution time $t_b$. When the process X jumps into a ready state for b, b could either get processed right away (and incur zero wait) or wait till the resource is available.

Recalling from the definition of the state process that if a node b waits for the resource to become available, it gets inserted in the set I. When node b is removed from the wait queue and becomes ready to run, it appears in both sets I and J. This is because set I counts all the nodes that are ready and waiting just before the transition. This is herein referred to as a wait-over state. Once a wait-over state (i,j,a) is identified, node b's wait at that state is denoted as $w_b^{ija}$.

It is shown that the average nodal wait $\overline{W}_b$ of node b is the average time node b waits before getting processed, which equals the average time node b waits after X jumps into its ready state, which, in turn, results in:

$$W_b = \frac{\text{Wait incurred by } b \text{ in its wait-over states} + \text{Wait incurred by } b \text{ in its no-Wait states}}{\text{Probability that process } X \text{ jumps into a ready state for } b};$$

$$W_b = \frac{\sum_{\forall i,ja|b\in I, b\in J} \pi_{i,ja} \times w_b^{i,ja}}{\sum_{\forall i,jab\in J, r_b=t_b} \pi_{i,ja}}.$$

The average time taken to process application App, i.e., average processing delay, $D_{av}$, is simply the sum of average nodal waits and average execution times of all the nodes along the execution path. $D_{av}$ can be calculated as follows:

Given that b is the predecessor node to the spacer node over execution path M, then the average processing delay of execution path m, i.e., $D_{av}^m$ is equal to the weighted average of run times at node b for path m in app, i.e., $$D_{av}^m = \frac{\sum_{\forall i,ja|b\in J} t^{App} \cdot \pi_{i,ja}^m}{\sum_{\forall i,ja|b\in J,} \pi_{i,ja}^m}$$

Thus, the overall processing delay of application over all its execution paths is:

$$D_{av} = \sum_{\forall m} D_{av}^m \cdot \gamma_m$$

and equals the terminal QoS.

To determine the probability that the processing delay of a particular execution path m of an application exceeds delay δ, let node b be the predecessor to the spacer node on the execution path m. Then, Pr{Processing delay of path m>δ}≜$\max_M$[Pr{Processing delay of path m>δ, m∈M}]. Note that the right side of this equation is a max operator over all adaptation vectors of which path m is an element.

The expression inside the max operator is the ratio of the number of times the processing delay of the path m exceeds δ to the number of times path m is activated. Recalling that $\Pi_{ija}^M$ represents the probability of a jump of the underlying process (Y, Z, U) to the state (i,j,a), conditioned on a jump, then if the focus is only on the jumps to a state where node b begins running, it is clear that the Pr{Processing delay of path m>δ, m∈M}=

$$= \frac{\text{number of times the processing delay exceeds } \delta}{\text{number of times the execution path ``}m\text{'' is activated}}$$

$$= \frac{\sum_{\forall i,ja} \pi_{i,ja}^M \mid b\in J, r_b=t_b, t_{app}+r_b>\delta}{\sum_{\forall i,ja} \pi_{i,ja}^M \mid b\in J, r_b=t_b}.$$

Having computed the processing delay of path m in the application, the processing delay of the entire application can be computed by simply choosing the worst-case processing delay among all its execution paths. That is, worst-case Pr{D>δ}=$\max_{\forall m}${Pr{$D^m$>δ}}. This expression is also referred to the probability of excess delay.

Figure 8A:
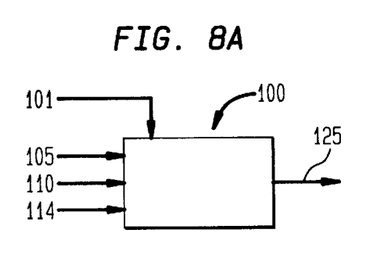
FIG. 8 illustrates implementation of the inventive methodology as a tool for generating a processing delay distribution for a terminal running one or more adaptive applications.
Figure 8B:
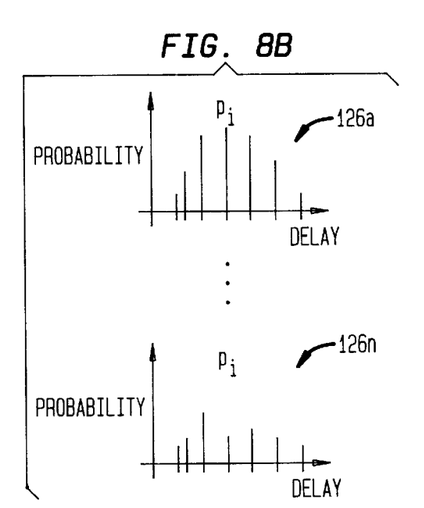

FIG. 8 illustrates a tool 100 that calculates the exact processing delay distribution of all of the applications concurrently running on a terminal. As shown in FIG. 8, inputs to the tool consist of the following variables: the particular adaptive application(s) 101, e.g., audio, video, etc., the adaptation algorithm(s) 105 employed for each application including a probability distribution of the time that an application resides in each adaptive state (e.g., PCM for audio) which is a uniform distribution, the adaptation level 110, and, system architecture and mapping information, i.e., the run-time environment 114, comprising, e.g., type of schedulers, cache size, number of processors, type of processors, etc. of the terminal. Utilizing the tool 100, the average processing delay and the exact processing delay distribution for each adaptive application can be computed using the simple linear equations described herein as programmed in any convenient high-level computer language. The output 125 of the tool 100 consists of one or more plots 126a, . . . , 126n of the processing delay distribution with the probability represented on the vertical axis and the processing delay incurred for each application on the x-axis, given a particular set of inputs. This information represents the QoS of the terminal given a set of inputs described above.

In accordance with the principles of the invention, the following performance metrics that can be used to evaluate a particular system architecture and mapping can be readily calculated. Two performance metrics are: 1) average nodal wait, as defined above, which is the mean time a node has to wait, once ready, before it can run on a resource to which it is mapped; and, 2) average resource wait, which is the weighted mean of the average nodal waits of all nodes that are mapped to a resource and is calculated as follows:

Denoting the set of nodes mapped to resource R as $B_R$, the average resource wait $\overline{W_R}$ is the weighted mean of the nodal waits of all the nodes mapped to resource R. Naturally, the weights have to be proportional to the relative frequency with which each node is being mapped to resource R. The relative frequency of node b is just the expected number of visits it makes to all its wait-over states (i,j) during the measurement interval. Since the measurement interval is the interval between two consecutive trips of the process X to state 0, it follows that the relative frequency is simply $\pi_{ija}/\pi_{000}$. Thus, the Average Resource Wait is equal to:

$$\overline{W_R} = \frac{\sum_{b\in B_R}\sum_{\forall i,ja|b\in I, b\in J} \pi_{i,ja} \cdot \overline{W_b}}{\sum_{b\in B_R}\sum_{\forall i,ja|b\in J, r_b=t_b} \pi_{i,ja}}$$

and is a measure of the resource contention at resource R.

The results such as shown in FIG. 8, and the performance metrics described herein have a wide utility in the following problems in networking and design of network terminals including:

1. Feasibility analysis of different adaptation levels: Given adaptive applications, these results help determine which adaptation levels are feasible and which are not. For instance, adaptation levels that incur a processing delay in excess of a threshold are infeasible.

2. System support of multiple concurrent applications: When multiple applications like audio and video share a network terminal, it is especially tricky to predict the interaction between them. The invention provides a technique to examine the end-to-end QoS (FIG. 1) as a summation of the net QoS+the terminal QoS of adaptive applications.

Figure 9:
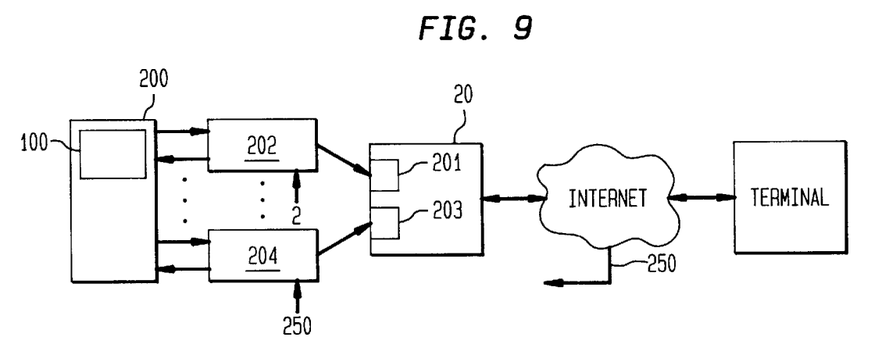
FIG. 9 illustrates implementation of the inventive methodology as an application manager for a terminal running one or more adaptive applications.

3. Adaptation algorithm design based on global optimality: The invention provides for a way to design application managers that tune adaptation algorithms for each application based on a certain global objective, i.e., the application manager can dynamically select adaptation levels based on a combination of terminal QoS and network QoS. Thus, for example, as shown in FIG. 9, the tool 100 may be invoked as an application manager 200, such that, when receiving QoS parameter feedback 250 from the network based on current network conditions, e.g., traffic, the performance of the terminal 20 may be optimized by modifying the adaptive algorithm in accordance with the overall processing delays (FIG. 8) as generated by the tool 100 to ensure that the terminal is utilized optimally.

Assuming that multiple applications, e.g., audio application 201 and corresponding adaptation algorithm 202 and video application 203 and corresponding adaptation algorithm 204 share the host terminal 20, the method of the tool 100 is used to calculate the processing delay (and the excess delay probability) for different combinations of adaptation levels of these applications. This is pre-computed (not run-time) and can be stored in a table, for example, on the host.

When implementing the tool, the user will specify the maximum acceptable processing delay for each particular application. As an example, an application may specify that, at most, 10% of its samples can exceed 100 ms processing delay. This excess delay probability is specific to an application.

Assume that "normally" each application adapts according to its native adaptation algorithm. Since this adaptation is done by each application independently of other applications, the new operation point may cause the excess delay probability to be infeasible for other applications. In such a case, the application manager 200 can modify at run-time the operation point by doing one or more of the following:

i). it may modify the new adaptation levels by consulting the table so that the excess delay probabilities for all applications are feasible; or, ii). if there is no room to do the above, it may give priorities to a specific application so that its excess delay probability reduces. Recalling that there may be a priority-based run-time scheduler (not shown) that schedules tasks from each application, by giving different priorities to an application, its performance may improve relative to other applications. In this case, the table of precomputations includes all possible priority values as well.

Figure 10:
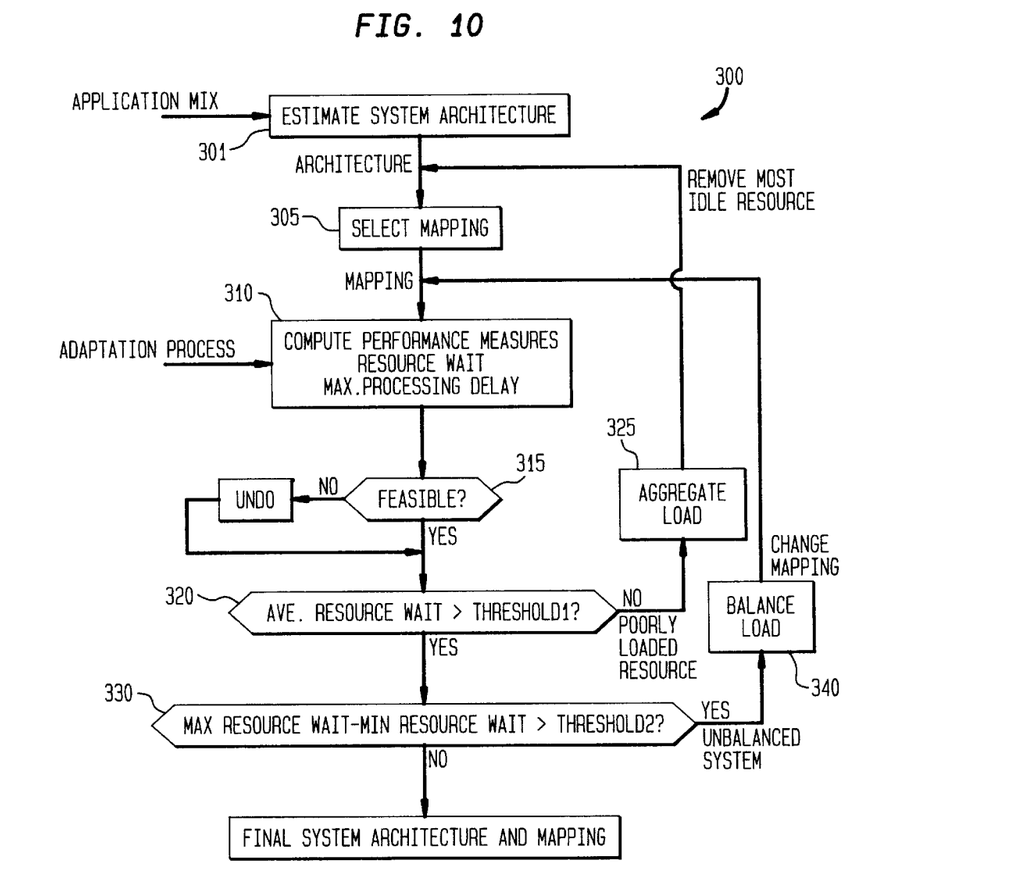
FIG. 10 is a flow chart implementing the inventive methodology for designing a system architecture.

In another application, the tool 100 may be implemented as part of a system-level design methodology. Particularly, FIG. 10 illustrates a methodology 300 that uses the analytical tool 100 to design a system architecture. As shown at step 301 in FIG. 10, an initial "crude" system architecture is first estimated that consists of resources such as processors and hardware modules (see, FIG. 6) and, the types of adaptive applications to be run at the terminal (application mix). As indicated at step 305, a default mapping of the nodes to the resources available in the crude system architecture is selected. This default mapping may be obtained either by intuition or by automated heuristics designed for static applications. In the next step 310, the analytical design tool 100 of the invention is used to compute performance measures such as the average resource wait time $\overline{W}_r$ for each resource, and the maximum processing delay $\Pr\{D>\delta\}$. From these measures, a feasibility check is done for all applications, as indicated at step 315. For instance, if the sum of the worst-case nodal waits and the executions times across all paths of an application is less than the real-time constraints imposed by the application, clearly the current solution is feasible for that application. This is repeated over all applications.

If the architecture is found feasible at step 315, the average resource wait is compared to a first threshold, Threshold1, as indicated at step 320. If the average resource wait is lower than Threshold1, this condition is indicative of a large slack in the system architecture. In this case, as indicated at step 325, a load aggregation move is executed whereby a node that is mapped to the least lightly loaded resource A is shifted to the next least lightly loaded resource B, i.e., nodes are combined from two processors onto a single one. The particular node to be moved can be selected using a priority function based on the combination of nodal execution times, nodal waits, and the critical path of the node. If there are no nodes left on resource A, it is removed from the system architecture and the process is repeated at step 305.

If the average resource wait is higher than Threshold1, at step 320, this signifies that the number of resources in the system architecture do not need to be pruned further. Thus, the algorithm continues at step 330 by comparing the maximum and the minimum resource waits. If the difference between the maximum and the minimum resource waits exceeds a threshold, Threshold2, this is indicative of an imbalance in the processing load of the resources. In this case, it is necessary to redistribute nodes onto processors to balance the load as indicated at step 340. One method for balancing the load may include the steps of: 1) computing the load on each processor (sum of execution times (see, FIG. 3) of nodes assigned to that processor); 2) ordering the processors according to the load; 3) and if the maxLoad–minLoad>delta, then moving a node from the processor with maximum load to the processor with minimum load and repeat the process. Delta is a user-specified tolerance of load mismatch or is computed as a fraction of the total load. The node and resource can be selected according to a priority function based on the nodal execution times and resource utilizations. After load balancing at step 340, the process returns to step 310 to compute performance measures. Note that in this methodology, the fast analytical tool replaces simulation in the critical loop and thus the speed-up factor grows as the process is repeated. The particular values of thresholds and the priority functions depend on the specific applications being considered.

The tool 100 can additionally be used to estimate performance for network-centric embedded systems having unique features such as concurrently running adaptive applications and limited processing power. Such network-centric system performance is difficult to estimate due to the dynamic varying of execution paths within each application, the dynamic behavior within an application path due to variable execution times, and, possibly unknown temporal skews between applications.

Figure 11:
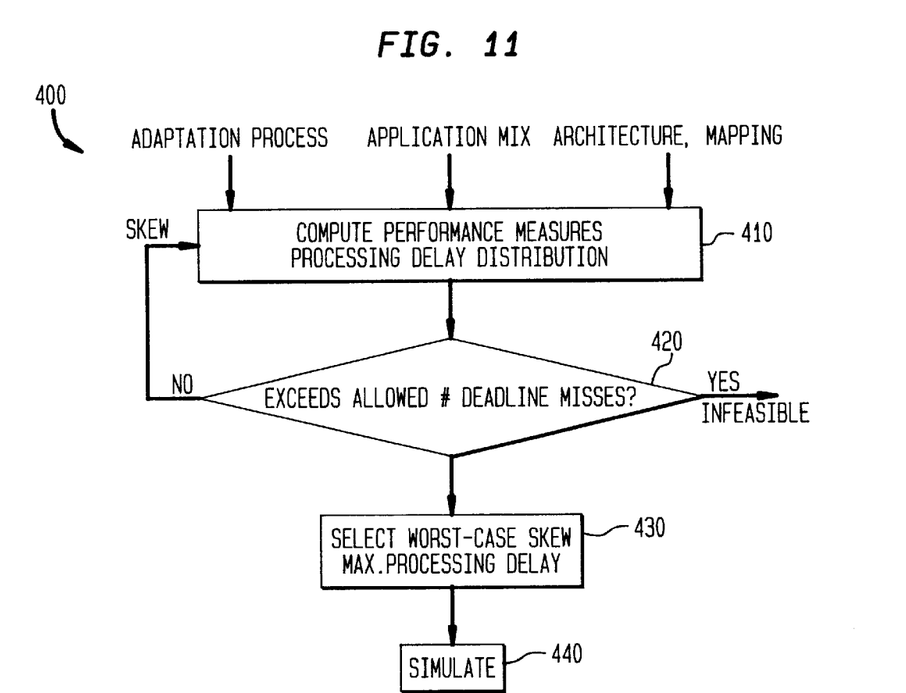
FIG. 11 is a flow chart implementing the inventive methodology for verifying performance of a particular system architecture.

FIG. 11 illustrates how the tool 100 of the invention can be used as a performance verification methodology 400. Given a particular set of inputs such as: system architecture and mapping, an application mix, and adaptation process (es), and given that a particular skew between application is created by such mix, the tool 100 is used to compute the processing delay distribution at step 410. Then, a check is made at step 420 to determine whether the processing delay distribution (see, FIG. 8) exceeds the number of allowed deadline misses at a particular skew. If the processing delay distribution exceeds the number of allowed deadline misses for that skew, then the particular mix of inputs is considered infeasible, i.e., the architecture cannot support the application mix. If the processing delay distribution does not exceed the number of allowed deadline misses, then the skew is varied (increased) and the process repeats at step 410 until the worst-case skew that can be supported by the application mix is determined. The worst-case skew selected is the one which yields the maximum processing delay as indicated at step 430.

Once the worst-case skew is determined, the system designers can extensively simulate the application mix with that particular skew on the system architecture as indicated at step 440. If the system architecture adequately supports this skew, by definition, it is guaranteed to handle other skews.

In summary, a system whose performance is intended to be analyzed by the methods of the invention is specified as a task graph, with repetitive behavior of applications captured through spacer nodes (FIG. 2(b)). Concurrent applications and skews are modelled as aggregated task graphs (See FIG. 4). The adaptation levels are modelled as Markov jump process and their effect is modeled through alternative execution paths through the application task graph. Computation within the system is modeled as a semi-Markov process and the performance metrics: average nodal wait, average resource wait, and the distribution of the processing delay is computed from the stationary distribution of the process. The metrics can be used for system-level design, performance verification, and adaptive application design.

The foregoing merely illustrates the principles of the present invention. Those skilled in the art will be able to devise various modifications, which although not explicitly described or shown herein, embody the principles of the invention and are thus within its spirit and scope.

What is claimed is:

1. Method for designing a system having resources enabling the concurrent execution of one or more adaptive applications, each of said adaptive applications consisting of a set of executable tasks sharing said system resources, said set of executable tasks having execution times depending on a particular adaptation level, said method comprising the steps of:

a) mapping components of each said adaptive application to system resources;

b) computing performance measures based upon a particular adaptation process, said performance measures including a measure of the resource contention at resource R;

c) comparing resource contention at each particular resource with a predetermined threshold; and, d) if said resource contention at a particular resource is less than said predetermined threshold, then removing a most idle resource from said mapping and returning to step a).

2. Method for designing a system according to claim 1, wherein said step of computing performance measures includes the step of computing a processing delay of each application.

3. Method for designing a system according to claim 1, wherein the step of computing a processing delay of each application includes the steps of:

a) modelling the adaptation of each adaptive application as an adaptation process having steady-state probability distribution representing the fraction of time spent by said application in a particular adaptation level;

b) modelling execution time variations of tasks in each application, for a particular adaptation level, by a random variable of arbitrary and known probability distribution;

c) modeling a system-wide computation by a state process, said state process capturing transitions of executing tasks as said tasks currently use or contend for shared system resources, said state process being characterized as a stochastic process;

d) calculating a stationary distribution $\pi^M$ from said stochastic state process; and, e) from said stationary distribution, calculating the processing delay of said adaptive applications.

4. Method for designing a system according to claim 3, wherein said step of modelling an adaptation process for each adaptive application includes the step of approximating the adaptation of each adaptive application as a jump process having a steady state transition probability distribution $\gamma_m$ representing a long-term fraction of time spent by said application in an adaptation level m.

5. Method for designing a system according to claim 4, further including the step of modelling the computation offered by an application in a particular adaptation level as a task graph consisting of nodes representing task level computations and arcs connecting said nodes for specifying execution precedence.

6. Method for designing a system according to claim 5, wherein system-wide state change occurs at specific time instances, each said time instants defined as a state transition time $A_n$, said step of modelling said state process includes the step of generating a joint sequence (Y, Z, U) enabling reproduction of an evolution of said state process where Y is a vector sequence equal to $\{Y_n, n=0, 1, \ldots\}$, where $Y_n=(I, w_I)$, where I is a set of nodes ready and waiting at transition time $A_n^{-}$, $w_I$ is the delay incurred by these nodes, and $A_n-$ denotes the time just prior to an $n^{th}$ transition time;

Z is a vector sequence equal to $\{Z_n, n=0, 1, \ldots\}$, where $Z_n=(J, r_J)$ where J is a set of nodes that are running at transition time $A_n$, $r_J$ is the remaining execution time of these nodes; and U is a vector sequence equal to $\{U_n, n=0, 1, \ldots\}$, where $U_n=(\text{App}, m^{APP}, t^{APP})$ where App is the application, $m^{App}$ is the adaptation application of application at instant $A_n^{-}$, and $t^{APP}$ is the elapsed time of application at time $A_n^{-}$.

7. Method for designing a system according to claim 6, wherein said joint sequence (Y,Z,U) makes transitions from a first state (i,j,a) to a second state (k,l,c), said step d) of calculating a stationary distribution further including the step of computing a transition probability function defined by:

$$R_{ija}^{klc} \triangleq P((Y_{n+1}, Z_{n+1}, U_{n+1}) = (k, l, c) \mid (Y_n, Z_n, U_n) = (i, j, a))$$

where (i,j,a), (k,l,c)∈S, where S is the state space of state process X.

8. Method for designing a system according to claim 7, wherein said stationary distribution represents the probability that (Y,Z,U) transitions to state (i,j,a), for a particular adaptation level m, given that (Y,Z,U) changes from a current state, said step of calculating said stationary distribution $\pi^M$ further including the step of solving a set of linear equations $$\sum_{(i,j,a)\in S} \Pi_{ija}^M \cdot R_{ija}^{klc} = \Pi_{klc}^M, \forall (k, l, c) \in S, \text{ and } \sum_{(k,l,c)\in S} \Pi_{klc}^M = 1.$$

9. Method for designing a system according to claim 8, further including the step of calculating an unconditioned stationary distribution π regardless of adaptation level m, said step of calculating π including the step of solving a set of linear equations:

$$\pi_{ija} = \sum_{\forall M} \pi_{ija}^M \cdot \gamma_M.$$

10. Method for designing a system according to claim 9, further including the step of calculating an average nodal wait time $\overline{W}_b$ representing a mean time a said node "b" has to wait before it can run on the resource it is mapped to, said calculating step including the steps of solving an equation $$\overline{W}_b = \frac{\sum_{\forall ija|b\in I, b\in J} \pi_{ija} \times w_b^{ija}}{\sum_{\forall ija|b\in J, r_b = t_b} \pi_{ija}}$$

where $r_b$ is equal to a value of node b's remaining execution time and is equal to its execution time $t_b$ and $w_b^{ija}$ represents node b's wait at state (i,j,a).

11. Method for designing a system according to claim 10, further including the step of calculating an average resource wait time $\overline{W}_R$ representing said measure of the resource contention at resource R, said calculating step including the steps of solving an equation $$\overline{W}_R = \frac{\sum_{b\in B_R} \sum_{\forall ija|b\in I, b\in J} \Box \pi_{ija} \cdot \overline{W}_b}{\sum_{b\in B_R} \sum_{\forall ija|b\in J, r_b = t_b} \pi_{ija}}$$

where $\overline{W}_b$ represents the average nodal wait time for node b.

12. Method for computing the processing delay of a terminal running a system of one or more adaptive applications, each adaptive application consisting of a set of executable tasks sharing system resources, said set of execution tasks having execution times depending on a particular adaptation level, said method comprising the steps of:
   a) modelling the adaptation of each adaptive application as an adaptation process having steady-state probability distribution representing the fraction of time spent by said application in a particular adaptation level;
   b) modelling execution time variations of tasks in each application, for a particular adaptation level, by a random variable of arbitrary and known probability distribution;
   c) modeling a system-wide computation by a state process X, said state process capturing transitions of executing tasks as said tasks currently use or contend for shared system resources, said state process being characterized as a stochastic process;
   d) calculating a stationary distribution $\pi^M$ from said stochastic state process; and,
   e) from said stationary distribution, calculating the processing delay of said adaptive applications.

13. A method according to claim 12, wherein said processing delay is calculated for a particular combination of adaptation levels.

14. A method according to claim 12, wherein said processing delay is calculated regardless of a combination of adaptation levels.

15. A method according to claim 12, wherein said step of modelling an adaptation process for each adaptive application includes the step of approximating the adaptation of each adaptive application as a jump process having a steady state transition probability distribution $\gamma_m$ representing a long-term fraction of time spent by said application in an adaptation level m.

16. A method according to claim 15, further including the step of modelling the computation offered by an application in a particular adaptation level as a task graph consisting of nodes representing task level computations and arcs connecting said nodes for specifying execution precedence.

17. A method according to claim 16, wherein system-wide state changes in a computation occur at specific time instances, each said time instants defined as a state transition time $A_n$, said step of modelling said state process includes the step of generating a joint sequence (Y, Z,U) enabling reproduction of an evolution of said state process X where
   Y is a vector sequence equal to $\{Y_n, n=0, 1, \ldots\}$, where $Y_n=(I, w_I)$, where I is a set of nodes ready and waiting at transition time $A_n^-$, $w_I$ is the delay incurred by these nodes, and $A_n^-$ denotes the time just prior to an $n^{th}$ transition time;
   Z is a vector sequence equal to $\{Z_n, n=0, 1, \ldots\}$, where $Z_n=(J, r_J)$ where J is a set of nodes that are running at transition time $A_n, r_J$ is the remaining execution time of these nodes; and
   U is a vector sequence equal to $\{U_n, n=0, 1, \ldots\}$, where $U_n=(\text{App}, m^{App}, t^{App})$ where App is the application, $m^{App}$ is the adaptation application of application at instant $A_n^-$, and $t^{App}$ is the elapsed time of application at time $A_n^-$.

18. A method according to claim 17, wherein said joint sequence (Y,Z,U) makes transitions from a first state (i,j,a) to a second state (k, l,c), said step d) of calculating a stationary distribution further including the step of computing a transition probability function defined by:

$$R_{ija}^{klc} \triangleq P((Y_{n+1}, Z_{n+1}, U_{n+1}) = (k, l, c) | (Y_n, Z_n, U_n) = (i, j, a))$$

where (i,j,a), (k,l,c) $\in$ S, where S is the state space of X.

19. A method according to claim 18, wherein said stationary distribution represents the probability that (Y,Z,U) transitions to state (i,j,a), for a particular adaptation level m, given that (Y,Z,U) changes from a current state, said step of calculating said stationary distribution $\pi^M$ further including the step of solving a set of linear equations $$\sum_{(i,j,a)\in S} \Pi_{ija}^M \cdot R_{ija}^{klc} = \Pi_{klc}^M, \forall (k, l, c) \in S, \text{ and } \sum_{(k,l,c)\in S} \Pi_{klc}^M = 1.$$

20. A method according to claim 18, further including the step of calculating an unconditioned stationary distribution π regardless of adaptation level m, said step of calculating π including the step of solving a set of linear equations:

$$\Pi_{ija} = \sum_{\forall M} \Pi_{ija}^M \cdot \gamma_M.$$

21. An application manager for optimizing system resources of a terminal in an interconnected network, said terminal having one or more concurrently running adaptive applications, each adaptive application consisting of a set of executable tasks sharing said system resources, said set of execution tasks having execution times depending on a particular adaptation level, said application manager comprising:

means for receiving feedback information from said network, said feedback indicating network performance;

means for computing a processing delay distribution for said terminal, said processing delay distribution based upon any combination of adaptation levels; and, means for changing an adaptation level for a particular adaptation application in accordance with said feedback information and said processing delay distribution computed for said terminal, whereby system resources are optimized.

22. An application manager as claimed in claim 1, further including means for comparing a processing delay computed for a first adaptive application against a predetermined threshold and determining feasibility of said change in said adaptation level of a second adaptive application.

23. An application manager as claimed in claim 22, wherein said means for computing a processing delay distribution for said terminal, further including means for determining a combination of adaptation level changes whereby excess delay probabilities for all adaptive applications are feasible.

24. An application manager as claimed in claim 21, wherein said step of computing the processing delay for said terminal comprises:

means for modelling the adaptation of each adaptive application as an adaptation process having a steady-state probability distribution representing the fraction of time spent by said application in a particular adaptation level;

means for modelling execution time variations of tasks in each application, for a particular adaptation level, by a random variable of arbitrary and known probability distribution;

means for modelling a system-wide computation by a state process X, said state process capturing transitions of executing tasks as said tasks currently use or contend for shared system resources, said state process being characterized as a stochastic process; and, means for calculating a stationary distribution $\pi^M$ from said stochastic state process, said processing delay for said terminal being calculated from said stationary distribution $\pi^M$.

25. An application manager according to claim 24, wherein said processing delay is calculated for a particular combination of adaptation levels.

26. An application manager according to claim 25, wherein said means for modelling an adaptation process for each adaptive application further includes means for approximating the adaptation of each adaptive application as a jump process having a steady state transition probability distribution $\gamma_m$ representing a long-term fraction of time spent by said application in an adaptation level m.

27. An application manager according to claim 26, further including means for modelling the computation offered by an adaptation application in a particular adaptation level as a task graph consisting of nodes representing task level computations and arcs connecting said nodes for specifying execution precedence.

28. An application manager according to claim 27, wherein said means for receiving feedback information from said network occurs at specific time instants, each said time instants defined as a state transition time $A_n$, said means for modelling the system-wide computation further including means for generating a joint sequence (Y,Z,U) enabling reproduction of an evolution of said state process where Y is a vector sequence equal to $\{Y_n, n=0, 1, \ldots\}$, where $Y_n=(I,w_I)$, where I is a set of nodes ready and waiting at transition time $A_n^-$, $w_I$ is the delay incurred by these nodes, and $A_n^-$ denotes the time just prior to an $n^{th}$ transition time;

Z is a vector sequence equal to $\{Z_n, n=0, 1, \ldots\}$, where $Z_n=(J, r_J)$ where J is a set of nodes that are running at transition time $A_n$, $r_J$ is the remaining execution time of these nodes; and U is a vector sequence equal to $\{U_n, n=0, 1, \ldots\}$, where $U_n=(\text{App}, m^{App}, t^{App})$ where App is the application, $m^{App}$ is the adaptation application of application at instant $A_n^-$, and $t^{App}$ is the elapsed time of application at time $A_n^-$.

29. An application manager according to claim 28, wherein said joint sequence (Y,Z,U) makes transitions from a first state (i,j,a) to a second state (k,l,c), said means for calculating a stationary distribution further including means for computing a transition probability function defined by:

$$R_{ija}^{klc} \triangleq P((Y_{n+1}, Z_{n+1}, U_{n+1}) = (k, l, c) | (Y_n, Z_n, U_n) = (i, j, a))$$

where (i,j,a),(k,l,c) $\in$ S, where S is the state space of state process X.

30. An application manager according to claim 29, wherein said stationary distribution represents the probability that said joint process (Y,Z,U) transitions to state (i,j,a), for a particular adaptation level m, given that (Y,Z,U) changes from a current state, said step of calculating said stationary distribution $\pi^M$ further including means for solving a set of linear equations $$\sum_{(i,j,a) \in S} \Pi_{ija}^M \cdot R_{ija}^{klc} = \Pi_{klc}^M, \forall (k, l, c) \in S, \text{ and } \sum_{(k,l,c) \in S} \Pi_{klc}^M = 1.$$

31. An application manager according to claim 30, further including means for calculating an unconditioned stationary distribution $\pi$ regardless of adaptation level m, said calculating means solving a set of linear equations:

$$\Pi_{ija} = \sum_{\forall M} \Pi_{ija}^M \cdot \gamma_M.$$

32. An application manager according to claim 23, wherein said adaptive application includes one of video and audio applications.

* * * * *